US012034328B2

United States Patent
Hoffmann (10) Patent No.: US 12,034,328 B2
(45) Date of Patent: Jul. 9, 2024

(54) METHOD FOR CONTROLLING THE CURRENT OUTPUT OF A BATTERY

(71) Applicant: Siemens Mobility GmbH, Munich (DE)

(72) Inventor: Wolfgang Hoffmann, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 203 days.

(21) Appl. No.: 17/786,034

(22) PCT Filed: Nov. 25, 2020

(86) PCT No.: PCT/EP2020/083407
§ 371 (c)(1),
(2) Date: Jun. 16, 2022

(87) PCT Pub. No.: WO2021/121890
PCT Pub. Date: Jun. 24, 2021

(65) Prior Publication Data
US 2023/0045807 A1 Feb. 16, 2023

(30) Foreign Application Priority Data
Dec. 16, 2019 (DE) ...................... 10 2019 219 677.2

(51) Int. Cl.
*H02J 7/00* (2006.01)
*B60L 15/20* (2006.01)
(Continued)

(52) U.S. Cl.
CPC ........ *H02J 7/00714* (2020.01); *H02J 7/0063* (2013.01); *H02J 7/345* (2013.01);
(Continued)

(58) Field of Classification Search
CPC ...... H02J 7/00714; H02J 7/0063; H02J 7/345; H02J 2207/20; H02J 2310/48;
(Continued)

(56) References Cited

U.S. PATENT DOCUMENTS

2015/0343910 A1* 12/2015 Geradts ................. B60L 15/007
290/14
2018/0105059 A1* 4/2018 Namou .............. G01R 31/3271

FOREIGN PATENT DOCUMENTS

| CN | 107379983 B | 7/2019 |
| DE | 102018203015 B3 | 5/2019 |
| JP | 2009072003 A | 4/2009 |

* cited by examiner

*Primary Examiner* — Zoheb S Imtiaz
(74) *Attorney, Agent, or Firm* — Laurence A. Greenberg; Werner H. Stemer; Ralph E. Locher (57) ABSTRACT

A method controls the current output of a battery for driving a rail vehicle. A battery actual current $I_{bat,ist}$ passes via a converter to an asynchronous motor, being a drive for the vehicle. The battery actual current $I_{bat,ist}$ is set by control circuits as a function of a feedforward control torque $M_{ff}$ and a specified torque $M_{tf}$. The feedforward control torque $M_{ff}$ is calculated using a transfer function $H_{sys}(z)$, which maps the torque setpoint value $M_{soll}$ onto the battery actual current $I_{bat,ist}$ as follows: $I_{bat}(z)$ $H_{sys}(z)$ $M_{soll}(z)$. Accordingly, a zero-point z=znmp, which lies outside the unit circle, is determined by the transfer function $H_{sys}(z)$. The feedforward control torque $M_{ff}$ is calculated as follows: $M_{ff}(z)$ $I_{bat,neu}(z)/(H_{sys}(z)$ $z)$ where: $I_{bat,neu}(z)=I_{bat,ideal}(z)$ $I_{bat,ideal}(z=znmp)$ where: $I_{bat,neu}[n]=I_{bat,ideal}[n]$ for all n>0, so that pole point/zero point cancellation is reached by z=znmp at the battery ideal current.

6 Claims, 6 Drawing Sheets

(51) Int. Cl.
  *B60L 50/51* (2019.01)
  *B60L 50/60* (2019.01)
  *B61C 3/00* (2006.01)
  *H02J 7/34* (2006.01)
  *H02P 23/30* (2016.01)

(52) U.S. Cl.
  CPC .............. *H02P 23/30* (2016.02); *B60L 15/20* (2013.01); *B60L 50/51* (2019.02); *B60L 50/60* (2019.02); *B60L 2200/26* (2013.01); *B60L 2210/40* (2013.01); *B61C 3/00* (2013.01); *H02J 2207/20* (2020.01); *H02J 2310/48* (2020.01); *H02P 2207/01* (2013.01)

(58) Field of Classification Search
  CPC ...... H02P 23/30; H02P 2207/01; B60L 50/60; B60L 50/51; B60L 15/20; B60L 2200/26; B60L 2210/40; B61C 3/00
  See application file for complete search history.

METHOD FOR CONTROLLING THE CURRENT OUTPUT OF A BATTERY

FIELD AND BACKGROUND OF THE INVENTION

The invention relates to a method for controlling a current output of a battery, wherein the battery is used as a traction battery for driving a rail vehicle.

Battery-operated rail vehicles in which electrical power is drawn from the battery and used to drive motors are known.

Figure 3:
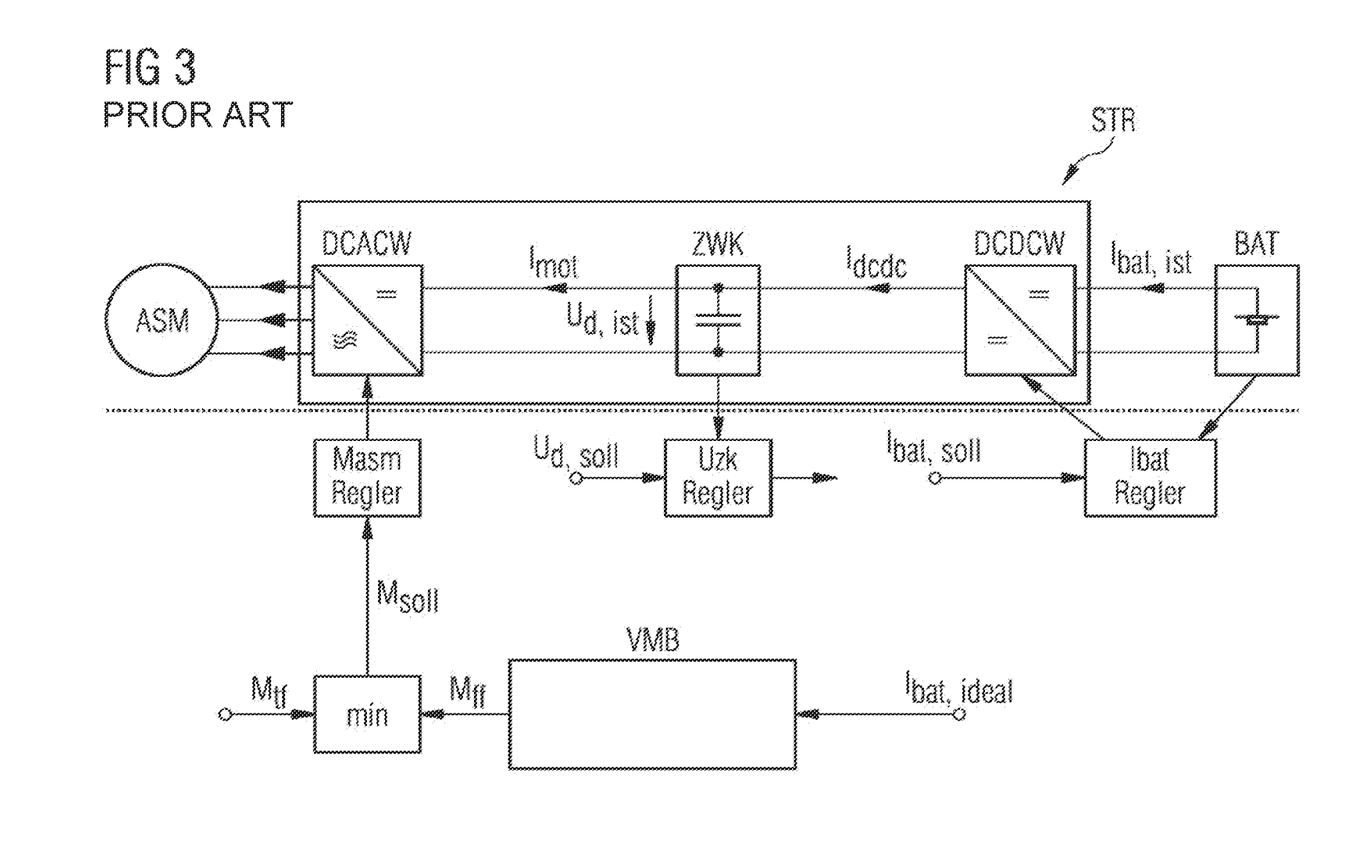
FIG. 3 is a block diagram of a control device according to the prior art.

FIG. 3 shows a simplified basic illustration of a controlled drive of such a rail vehicle according to the prior art.

The input side of a current converter STR is connected to a battery BAT and the output side thereof is connected to an asynchronous motor ASM.

The asynchronous motor ASM is used as a traction motor of a traction unit or rail vehicle while the battery BAT is used as a traction battery.

The current converter STR contains a series circuit consisting consecutively of a DC/DC converter DCDCW, a (DC) link circuit ZWK and a DC/AC converter DCACW.

The DC/DC converter DCDCW is connected as input element of the current converter STR to the battery BAT while the DC/AC converter DCACW is connected as output element of the current converter STR to the asynchronous motor ASM.

An electric actual battery current $I_{bat,ist}$ thus passes from the battery BAT to the DC/DC converter DCDCW of the current converter STR, which converts said actual battery current to a link circuit direct current $I_{dcdc}$.

The link circuit direct current $I_{dcdc}$ passes, as motor current $I_{mot}$, to the DC/AC converter DCACW via the link circuit ZWK.

A capacitor, to which a differential actual voltage $U_{d,ist}$ is applied, is arranged in the link circuit ZWK.

The motor current $I_{mot}$ passes, as three-phase current, to the asynchronous motor ASM via the DC/AC converter DCACW in order to drive said asynchronous motor.

The DC/DC converter DCDCW is controlled by means of a battery current controller, $I_{bat}$ controller, in order to set the link circuit direct current $I_{dcdc}$. For this purpose, a setpoint battery current $I_{bat,soll}$ and an actual current $I_{bat,ist}$ of the battery BAT are fed to the battery current controller, $I_{bat}$ controller, as input signal.

The link circuit ZWK is connected to a link circuit voltage controller, $U_{zk}$ controller. A differential setpoint voltage $U_{d,soll}$ and a differential actual voltage $U_{d,ist}$ are fed to the link circuit voltage controller, $U_{zk}$ controller, as input signal. The setpoint battery current $I_{bat,soll}$ is formed therefrom.

The DC/AC converter DCACW and the asynchronous motor ASM are controlled by means of an asynchronous motor torque controller, $M_{asm}$ controller. For this purpose, a setpoint torque value $M_{soll}$ is fed to the asynchronous motor torque controller, $M_{asm}$ controller, as input signal.

The setpoint torque value $M_{soll}$ is formed from a feedforward control torque $M_{ff}$ and from a specified torque $M_{tf}$, which are fed to a minimum value formation unit MIN as respective input signals.

The feedforward control torque $M_{ff}$ is calculated in this case using a feedforward control unit VMB while the specified torque $M_{tf}$ is requested or enabled by the traction unit or rail vehicle driver at one time.

The following condition is ensured using the minimum value formation unit MIN:

$$M_{soll} \leq M_{tf}$$

In order to calculate the feedforward control torque $M_{ff}$, an ideal battery current $I_{bat,ideal}$ is fed to the feedforward control torque calculate unit VMB.

The feedforward control torque $M_{ff}$ is calculated in this case in such a way that the actual battery current $I_{bat,ist}$ corresponds to the predefined ideal battery current $I_{bat,ideal}$ as accurately as possible:

$$I_{bat,ist} = I_{bat,ideal}$$

The ideal battery current $I_{bat,ideal}$ is determined or defined in this case in such a way that a predefined maximum battery current is not exceeded in driving procedures of the rail vehicle. This is necessary in order to prevent a safety shutdown of the battery BAT due to excessively high currents or due to an excessively high power draw.

The ideal battery current $I_{bat,ideal}$ is furthermore determined or defined in such a way that a rapid buildup of a required traction torque of the asynchronous motor ASM is made possible. This is necessary in order to reduce restrictions during travel of the traction unit as far as possible.

The feedforward control torque $M_{ff}$ is conventionally calculated using a dynamic (transformed) transfer function $H_{sys}(z)$ of the setpoint torque value $M_{soll}$ onto the actual battery current $I_{bat,ist}$.

The transfer function $H_{sys}(z)$ is inverted in order to obtain an inverse transfer function $H_{sys}^{-1}(z)$.

The inverse transfer function $H_{sys}^{-1}(z)$ is multiplied by the (transformed) ideal battery current $I_{bat,ideal}(z)$ in order to obtain the feedforward control torque $M_{ff}(z)$ therefrom. This is explained in more detail below.

By means of the basic illustration shown here, a situation is achieved in which the battery BAT is used in the driving procedures in an electrically ideal manner without infringing current limitation values of the battery BAT.

This makes it possible for respective drive components of the traction unit to be operated with optimum energy for driving specifications of the traction unit driver. A projected traction of the traction unit is thus available to the traction unit driver at any time and to the maximum extent.

Figure 4:
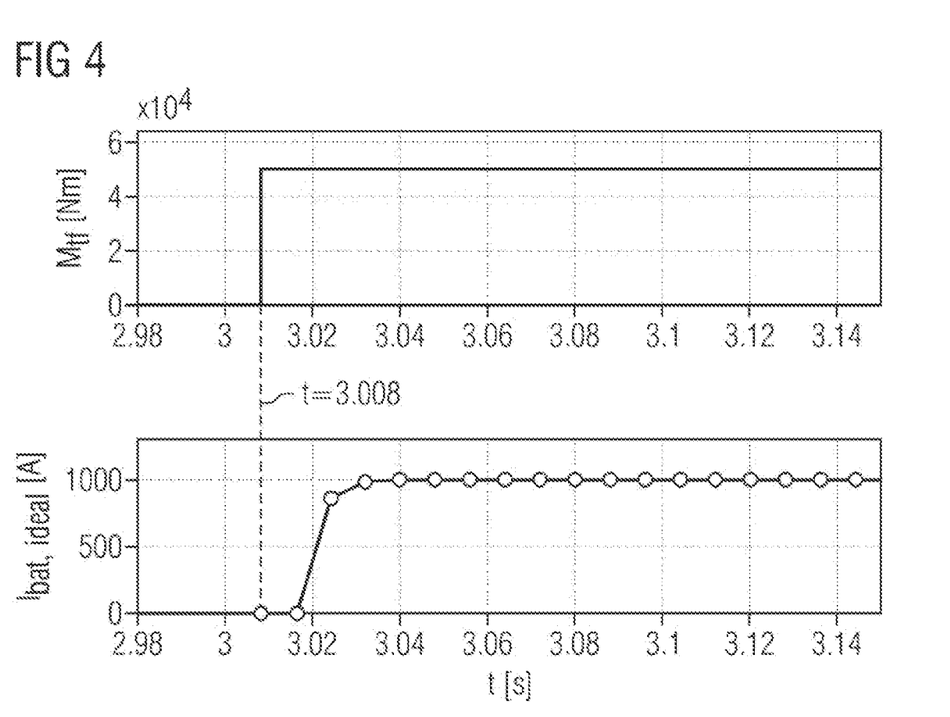
FIG. 4 is a graph showing the torque of the traction unit driver at a desired ideal battery current.

FIG. 4 shows the specified torque $M_{tf}$ of the traction unit driver at a desired ideal battery current $I_{bat,ideal}$ in comparison with FIG. 3.

For example, the specified torque $M_{tf}$ is requested or enabled by the traction unit driver at the time t=3.008.

At the time t=3.016, an ideal, desired current output from the battery BAT in the form of the ideal battery current $I_{bat,ideal}$ occurs with a time delay. The desired profile of the ideal battery current $I_{bat,ideal}$ is in this case linear and does not exhibit any oscillations.

In this example, the following relationship applies for a transform of the ideal battery current $I_{bat,ideal}$ by way of example:

$$I_{bat,ideal}(z) = 850z/(z^2 - 1.15z + 0.15)$$

This is the mathematical description of the illustrated profile.

Figure 5:
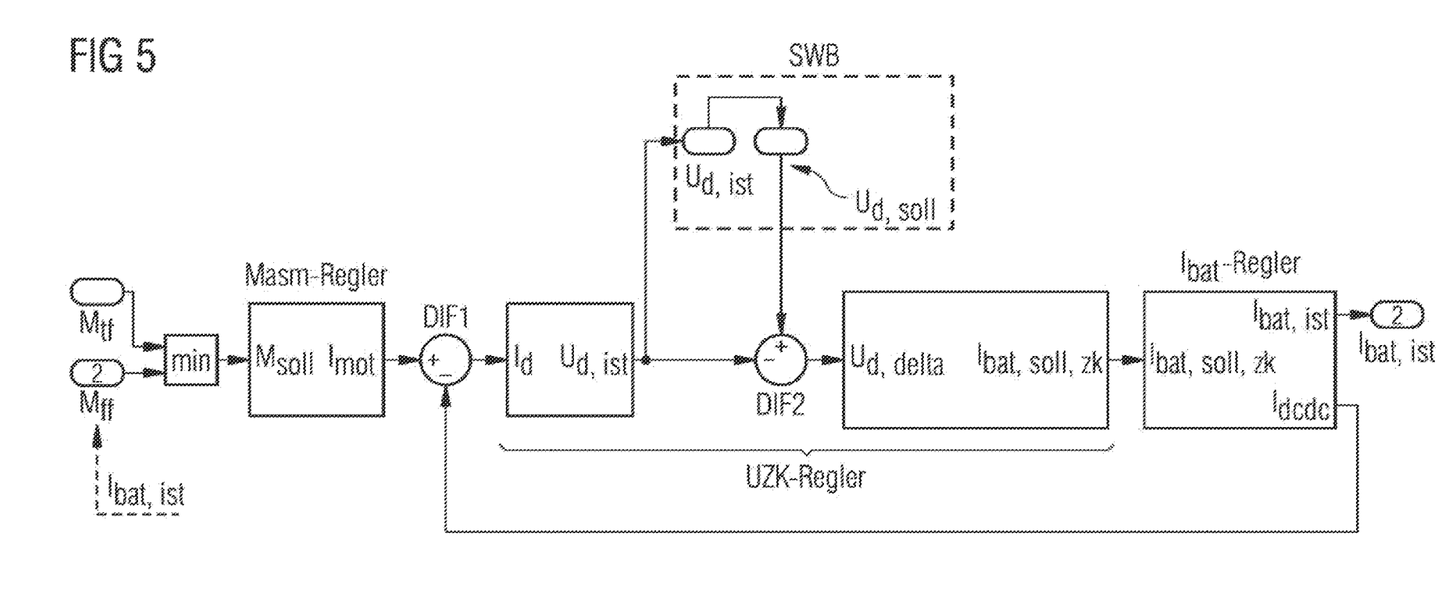
FIG. 5 is a signal flow diagram of a controlled system of a battery drive system.

FIG. 5 shows a signal flow graph of the controlled system of the battery drive system from FIG. 3.

As described above for FIG. 3, the setpoint torque value $M_{soll}$ is formed from the feedforward control torque $M_{ff}$ and from the specified torque of the traction vehicle driver $M_{tf}$, the setpoint torque value passing to the asynchronous motor torque controller, $M_{asm}$ controller, as input signal.

The asynchronous motor torque controller, $M_{asm}$ controller, controls the torque of the asynchronous motor ASM by means of the DC/AC converter DCACW. This results in the motor current $I_{mot}$.

The motor current $I_{mot}$ passes to a first input of a first difference forming unit DIF1.

The link circuit direct current $I_{dcdc}$ passes to a second input of the first difference forming unit DIF1.

The difference forming unit DIF1 forms a differential current $I_d$ from said currents:

$$I_d = I_{mot} - I_{dcdc}.$$

The differential current $I_d$ passes to the link circuit voltage controller, $U_{zk}$ controller, as input signal and is converted to the actual differential voltage $U_{d,ist}$.

The actual differential voltage $U_{d,ist}$ passes to a first input of a second difference forming unit DIF2.

The actual differential voltage $U_{d,ist}$ passes as input signal to a setpoint value former SWB, which specifies the setpoint differential voltage $U_{d,soll}$ based on the actual differential voltage $U_{d,ist}$.

The setpoint differential voltage $U_{d,soll}$ passes as output signal of the setpoint value former SWB to a second input of the second difference forming unit DIF2.

The second difference forming unit DIF2 forms a differential voltage $U_{d,delta}$ from the supplied voltages:

$$U_{d,delta} = U_{d,soll} - U_{d,ist}.$$

An associated link circuit setpoint battery current $I_{bat,soll,zk}$ is ascertained for the differential voltage $U_{d,delta}$.

The link circuit setpoint battery current $I_{bat,soll,zk}$ passes as input signal to the battery current controller, $I_{bat}$ controller, which specifies both the actual battery current $I_{bat,ist}$ and the link circuit direct current $I_{dcdc}$ based thereon.

As illustrated above, the following holds true:

$$I_{bat,ist} = I_{bat,ideal}$$

and $$I_{bat}(z) = H_{sys}(z) M_{soll}(z)$$

The partial models used to model the signal flow graphs shown are linear.

The feedforward control torque $M_{ff}$ necessary for this is now calculated as follows:

$$M_{ff}(z) = H_{sys}^{-1}(z) I_{bat,ideal}(z)/z$$

The transfer function $H_{sys}(z)$ of a typical system modeling from FIG. 3 is not of minimum phase, such that it cannot be inverted in a stable manner. This can be identified in that a zero point znmp exists outside of the unit circle.

A feedforward control torque calculated therefrom would thus be infinitely great and therefore cannot be used.

An exemplary, realistic numerical example for the transfer function $H_{sys}(z)$ in view of FIG. 3 could read as follows:

$$H_{sys}(z) = (0.030226(z+1.017)(z+0.4928))/((z-0.2636)(z^2+1.761z+0.7783))$$

with a zero point znmp=−1.017.

This zero point znmp lies outside of the unit circle, with the result that oscillations in the battery current are to be expected, while the feedforward control torque would have to increase above all limits.

In order to circumvent this problem, in practice, the dynamic transfer function $H_{sys}(z)$ is inverted not as a whole but only in terms of its static component. This is effected by the following approximation:

$$H_{sys}^{praxis}(z) = H_{sys}(z=1)$$

$H_{sys}(z=1)$ is a scalar that can be inverted easily.

Figure 6:
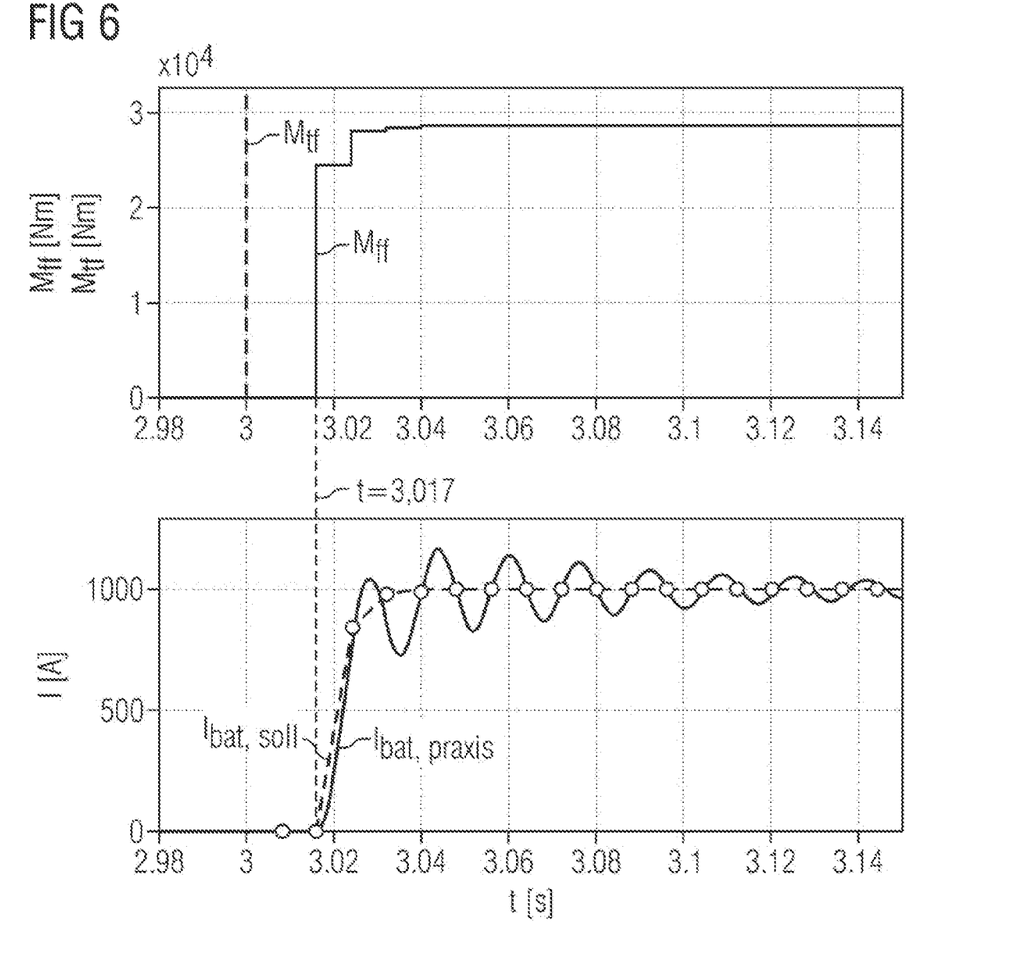
FIG. 6 is a graph showing the torque of the traction unit drive, the feedforward control torque and the profile of the battery current.

FIG. 6 shows the specified torque $M_{tf}$ of the traction unit driver, of the feedforward control torque $M_{ff}$ and the profile of the battery current $I_{bat}$ from practice in comparison with FIG. 3 to FIG. 5.

At the time t=3, for example the specified torque $M_{tf}$ is requested or enabled by the traction unit driver.

At the time t=3.017, in practice a feedforward control torque $M_{ff}$ with a time delay is formed, which has stages.

At the time t=3.017, in the illustration of the battery current $I_{bat}$, a desired (ideal) setpoint battery current $I_{bat,soll}$ is shown, the profile of which is linear and has no oscillations.

At the time t=3.017, in the illustration of the battery current $I_{bat}$, a real battery current $I_{bat,praxis}$ corresponding to practice is shown, the profile of which is linear but is subjected to oscillations.

These oscillations are disruptive because the battery system, as described above, could shut down due to the oscillations.

A lower rise is specified for the battery current by means of the practical procedure described above, wherein, however, traction is wasted with consequences for driving style, timetables and with consequences for the design of drive components.

SUMMARY OF THE INVENTION

It is therefore the object of the present invention to specify a method for specifying a feedforward control torque $M_{ff}$ for a traction unit having a traction battery, using which method the current draw at the battery is exploited ideally in start-up processes without infringing specified current limitation values of the battery in the process.

This object is achieved by the features of the independent claim. Advantageous developments are given in the dependent claims.

DETAILED DESCRIPTION OF THE INVENTION

The method according to the invention is based in summary on an unstable system component of the inverse transfer function being managed by $H_{sys}(z)$ in such a way that oscillations and unstable behavior in the battery current are prevented.

To this end, the ideal battery current is manipulated as follows in order to calculate the feedforward control torque $M_{ff}$:

$$M_{ff}(z) = H_{sys}^{-1}(z) I_{bat,neu}(z)/z$$

$$M_{ff}(z)=I_{bat,neu}(z)/H_{sys}(z)z)$$

with $$I_{bat,neu}(z)=I_{bat,ideal}(z)-I_{bat,ideal}(znmp)$$

This results in:

$$M_{ff}(z)=(I_{bat,ideal}(z)-I_{bat,ideal}(znmp))/H_{sys}(z)z)$$

With the selection of z=znmp in the ideal battery current $I_{bat,ideal}$, a pole/zero point cancelation is achieved.

The pole/zero point cancelation reduces or prevents oscillations with respect to the preceding figures.

In the present invention, a zero-point-dependent constant is added to the z-transform of the desired ideal battery current value $I_{bat,ideal}$ (z).

The value of the constants is referred to as $I_{bat,ideal}$ (znmp), wherein z=znmp denotes the position of a zero point outside of the unit circle of the transfer function $H_{sys}(z)$.

The addition of the constants $I_{bat,ideal}$ (znmp) in the z range has an effect in the time range only on the first value of the associated result.

The original ideal signal of the battery current $I_{bat,ideal}$ (z) has to be changed only at the first point; otherwise, the following relationship holds true:

$$I_{bat,neu}[n]=I_{bat,ideal}[n] \text{ for all } n>0.$$

Figure 1:
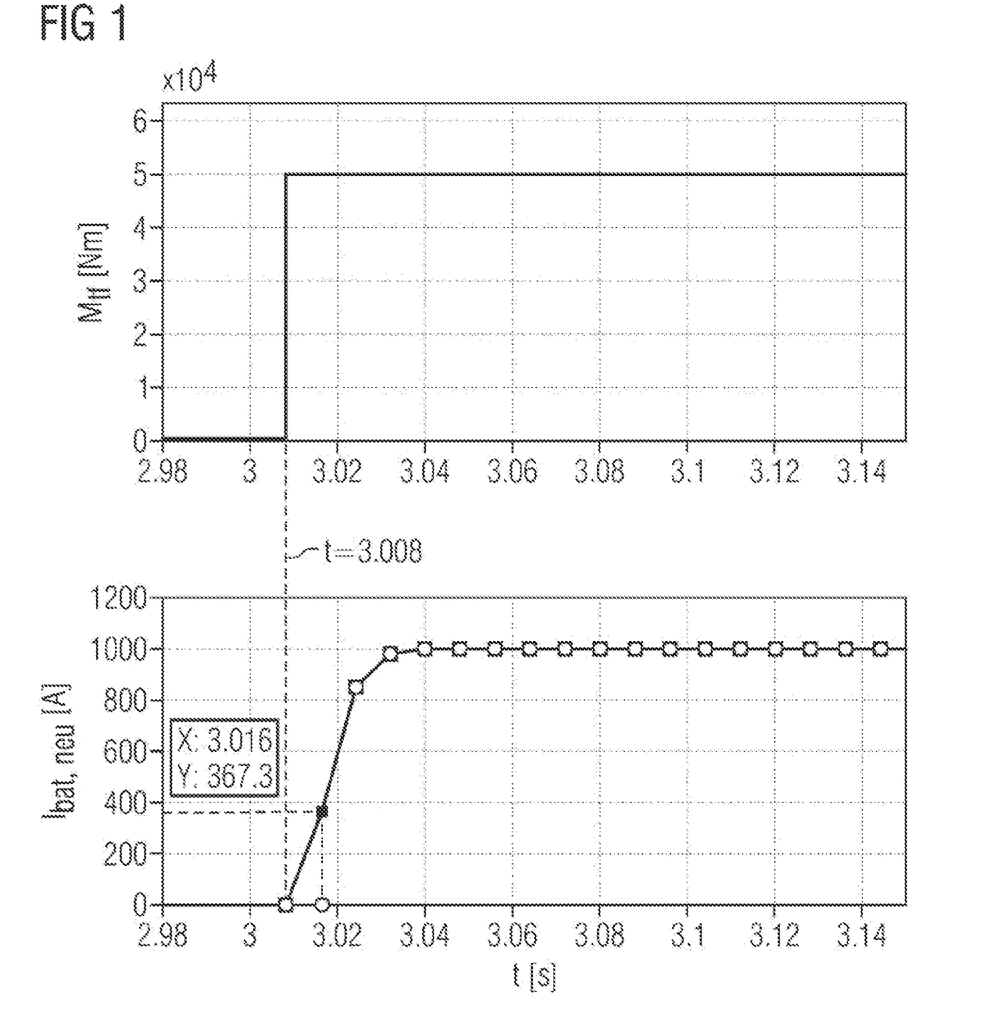
FIG. 1 is a graph showing a torque of a traction unit driver at a battery current.

FIG. 1 shows in comparison with FIG. 3 the specified torque $M_{ff}$ of the traction unit driver at a battery current $I_{bat,neu}$, which has been manipulated using the present invention, in order to be drawn from the battery.

At the time t=3.008, for example the specified torque $M_{ff}$ is requested or enabled by the traction unit driver.

Figure 2:
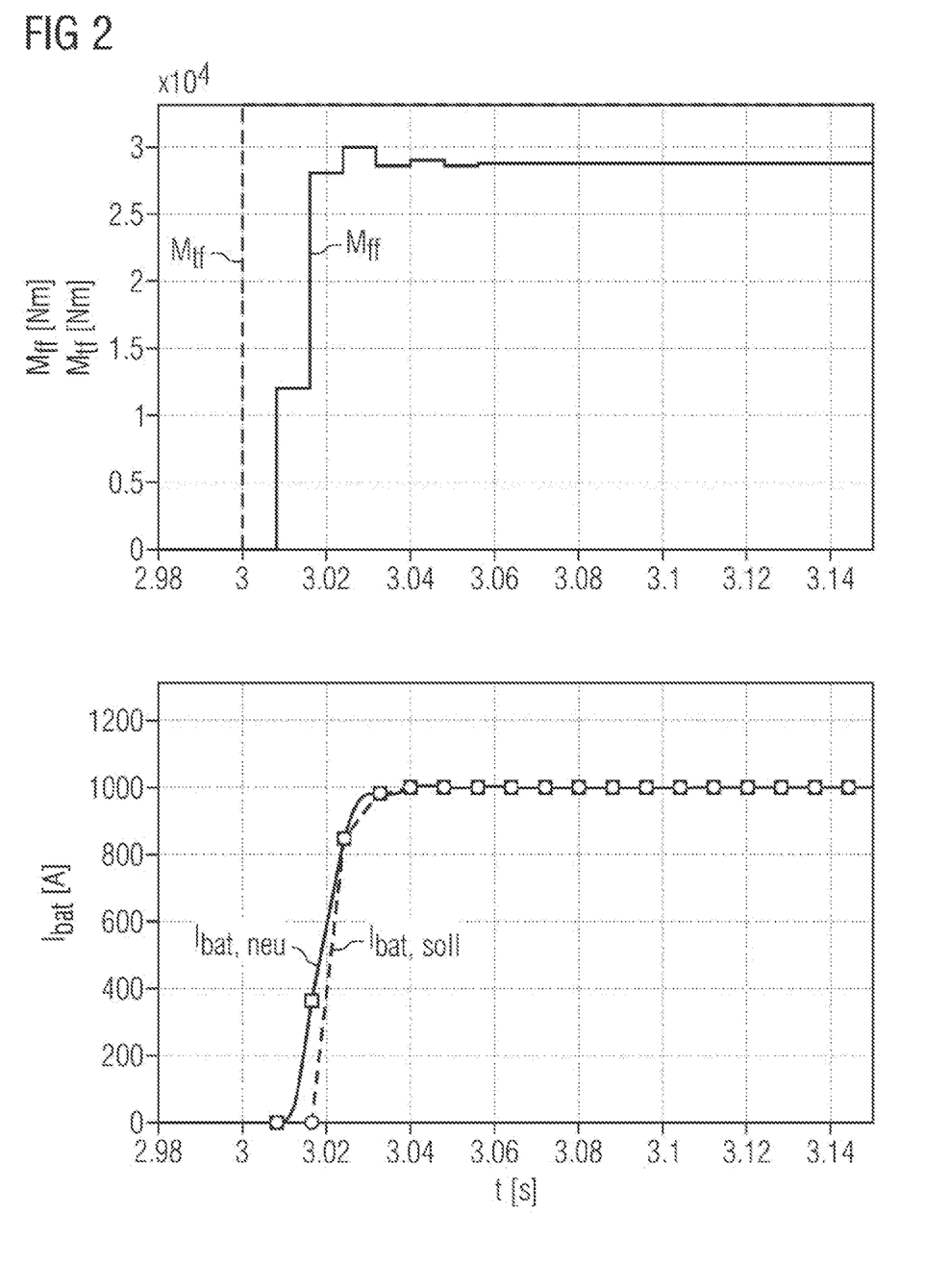
FIG. 2 is a graph showing the torque of the traction unit driver, a feedforward torque and a profile of the battery current.

With reference to FIG. 2, at the time t=3.008, a current is output from the battery BAT in the form of the battery current $I_{bat,neu}$.

The desired profile of the battery current $I_{bat,neu}$ no longer exhibits any oscillations or overshoots.

With reference to FIG. 4, originally the first value of the ideal battery current $I_{bat,ideal}[n]=0$ at the time t=3.016.

After a successful manipulation according to the invention, the value of the ideal, new battery current $I_{bat,neu}[n]=367.3$ A at the time t=3.016 s.

Accordingly, observing the principal according to the invention, the z-transform of the new profile of the new battery current $I_{bat,neu}(z)$ is multiplied by the transfer function of the inverse of the transfer function $H_{sys}^{-1}(z)$ as follows:

$$M_{ff}(z)=H_{sys}^{-1}(z)I_{bat,neu}(z)/z$$

This results in a specified feedforward control torque $M_{ff}(z)$, the values of which no longer oscillate or the values of which remain within predefined limits.

FIG. 2 shows a comparison of the specified torque $M_{ff}$ of the traction unit driver, the feedforward control torque $M_{ff}$ and the profile of a battery current $I_{bat}$ based on the present invention.

At the time t=3, for example the specified torque $M_{ff}$ is requested or enabled by the traction unit driver.

At the time t=3.008, a feedforward control torque $M_{ff}$ with a time delay is formed, which has stages.

At the time t=3.017, in the illustration of the battery current $I_{bat}$, a desired (ideal) setpoint battery current $I_{bat,soll}$ is shown, the profile of which is linear and does not have any oscillations.

At the time t=3.008, in the illustration of the battery current $I_{bat}$, a battery current $I_{bat,neu}$ formed according to the invention is shown, the profile of which is linear and does not have any oscillations.

The profile of the battery current $I_{bat,neu}$ follows the desired battery current $I_{bat,soll}$ with very good approximation.

The present invention makes it possible to generate a setpoint torque value $M_{soll}$, wherein a desired battery current is drawn according to the power demand of the towing vehicle driver without infringing limit specifications of the battery.

The present invention makes it possible to ideally set the battery current without causing overshoots or oscillations in the battery current in the process.

The method according to the invention is based on an unstable system component not being excited by the new setpoint signal profile.

As stated above, the following holds true:

$$M_{ff}(z)=H_{sys}^{-1}(z)I_{bat,neu}(z)/z$$

$$M_{ff}(z)=I_{bat,ideal}(z)-I_{bat,ideal}(znmp)/(z\ H_{sys}(z))$$

A pole/zero point cancelation is identified for z->znmp. This achieves a situation in which the calculated sequence for $I_{bat,neu}$ no longer oscillates over defined limits.

This can also be read from a concrete numerical example, which is based on the statements made above relating to $H_{sys}$ (z):

$$M_{ff}(z) = \frac{(z-0.2636)(z^2+1.761z+0.7783)}{0.030226(z+1.017)(z+0.4928)z}\left(\frac{850z}{z^2-1.15z+0.15}+367.26\right)$$

$$= \frac{(z-0.2636)(z^2+1.761z+0.7783)}{0.030226(z+1.017)(z+0.4928)z}\frac{367.26(z+1.017)(z+0.1475)}{(z-1)(z-0.15)}$$

$$= 12151\frac{(z-0.2636)(z^2+1.761z+0.7783)}{(z+0.4928)z}\frac{(z+0.1475)}{(z-1)(z-0.15)},$$

It is identified that the originally present pole zp=−1.017 is no longer present outside of the unit circle after the transformation.

The invention claimed is:

1. A method for controlling a current output of a battery, wherein the battery is used as a traction battery for driving a rail vehicle, which comprises the steps of:
passing an actual battery current $I_{bat,ist}$, as a link circuit direct current, to a link circuit via a rectifier;
applying an actual differential voltage $U_{d,ist}$ to the link circuit;
passing the link circuit direct current $I_{dcdc}$, as a motor current $I_{mot}$, from the link circuit to a DC/AC converter, which converts the motor current $I_{mot}$ to a three-phase alternating current;
feeding the three-phase alternating current to an asynchronous motor, which is used as a drive of the rail vehicle;
controlling the asynchronous motor and the DC/AC converter via a torque controller;
using the torque controller to control a setpoint torque value $M_{soll}$, by way of which the motor current $I_{mot}$ is set;
using a link circuit voltage controller to determine a setpoint battery current $I_{bat,soll}$ based on a setpoint differential voltage $U_{d,soll}$ and based on an the actual differential voltage $U_{d,ist}$, the link circuit direct current lac& being set based on the setpoint battery current;

controlling the DC/DC converter by means of a battery current controller, which sets the link circuit direct current lac& based on the setpoint battery current $l_{bat,soll}$ and based on the actual battery current $l_{bat,ist}$;

forming the setpoint torque value $M_{soll}$ from a feedforward control torque $M_{ff}$ and from a specified torque $M_{tf}$ taking into account a relationship of $M_{tf}$>max ($M_{ff}$);

forming the feedforward control torque $M_{ff}$ based on the actual battery current $l_{bat,ist}$ until the actual battery current $l_{bat,ist}$ corresponds to an ideal battery current $l_{bat,ideal}$;

calculating the feedforward control torque $M_{ff}$ using a transfer function $H_{sys}(Z)$, which maps the setpoint torque value $M_{soll}$ onto the actual battery current $l_{bat,ist}$ as follows:

$$l_{bat}(Z)=H_{sys}(Z)M_{soll}(Z),$$

determining a zero point z=znmp, which lies outside of a unit circle, by the transfer function $H_{sys}(z)$; and calculating the feedforward control torque $M_{ff}$ as follows:

$$M_{ff}(Z)=l_{bat,neu}(Z)/(H_{sys}(Z)Z)$$

with:

$$l_{bat,neu}(z)=l_{bat,ideal}(Z)-l_{bat,ideal}(Z=Znnmp)$$

and with:

$$l_{bat,neu}[n]=l_{bat,ideal}[n] \text{ for all } n>0,$$

such that a pole point/zero point cancelation is achieved by z=znmp at the ideal battery current $l_{bat,ideal}$.

2. The method according to claim 1, which further comprises using a converter unit as the DC/AC converter.

3. The method according to claim 1, which further comprises applying the actual differential voltage of the link circuit to a capacitor.

4. The method according to claim 1, wherein the specified torque $M_{tf}$ is requested or enabled by a traction unit driver.

5. The method according to claim 1, which further comprises determining or defining the ideal battery current $l_{bat,ideal}$ such that predefined maximum battery currents are not exceeded in driving procedures of the rail vehicle.

6. The method according to claim 1, which further comprises determining or defining the ideal battery current $l_{bat,ideal}$ such that a rapid buildup of a required traction torque of the asynchronous motor is made possible.

* * * * *

UNITED STATES PATENT AND TRADEMARK OFFICE
CERTIFICATE OF CORRECTION

| | |
|---|---|
| PATENT NO. | : 12,034,328 B2 |
| APPLICATION NO. | : 17/786034 |
| DATED | : July 9, 2024 |
| INVENTOR(S) | : Wolfgang Hoffmann |

It is certified that error appears in the above-identified patent and that said Letters Patent is hereby corrected as shown below:

In the Claims

Claim 1, Column 7, Lines 1-4 should read as follows:
controlling the DC/DC converter by means of a battery current controller, which sets the link circuit direct current $I_{dcdc}$ based on the setpoint battery current $I_{bat,soll}$ and based on the actual battery current $I_{bat,ist}$;

Signed and Sealed this
Twenty-seventh Day of August, 2024

Katherine Kelly Vidal
*Director of the United States Patent and Trademark Office*